United States Patent
de Samber et al.

(10) Patent No.: US 10,995,915 B2
(45) Date of Patent: May 4, 2021

(54) LED MODULE AND LIGHTING MODULE

(71) Applicant: Lumileds LLC, San Jose, CA (US)

(72) Inventors: Marc Andre de Samber, Aachen (DE); Norbertus Antonius Maria Sweegers, Aachen (DE); Floris Maria Hermansz Crompvoets, Aachen (DE)

(73) Assignee: Lumileds LLC, San Jose, CA (US)

( * ) Notice: Subject to any disclaimer, the term of this patent is extended or adjusted under 35 U.S.C. 154(b) by 293 days.

(21) Appl. No.: 15/754,961

(22) PCT Filed: Aug. 25, 2016

(86) PCT No.: PCT/EP2016/070041
§ 371 (c)(1),
(2) Date: Feb. 23, 2018

(87) PCT Pub. No.: WO2017/036900
PCT Pub. Date: Mar. 9, 2017

(65) Prior Publication Data
US 2020/0149697 A1 May 14, 2020

(30) Foreign Application Priority Data
Sep. 2, 2015 (EP) .................................... 15183484

(51) Int. Cl.
*F21K 9/60* (2016.01)
*F21S 41/151* (2018.01)
(Continued)

(52) U.S. Cl.
CPC .............. *F21K 9/60* (2016.08); *F21S 41/143* (2018.01); *F21S 41/151* (2018.01); *G02B 27/30* (2013.01)

(58) Field of Classification Search
CPC ........ F21S 41/151; F21S 41/32; G02B 27/30; F21V 5/007
(Continued)

(56) References Cited

U.S. PATENT DOCUMENTS

| 8,764,259 B2 | 7/2014 | Schug |
| 2013/0113010 A1 | 5/2013 | Brunner et al. |
| 2014/0316742 A1* | 10/2014 | Sun .................... G02B 19/0028 702/167 |

FOREIGN PATENT DOCUMENTS

| JP | 2004103503 A | 4/2004 |
| WO | 20110107908 A1 | 9/2011 |
| WO | 2015090706 A1 | 6/2015 |

OTHER PUBLICATIONS

EPO as ISA, "International Search Report and Written Opinion" dated Oct. 27, 2016 from International Application No. PCT/EP2016/070041, filed Aug. 25, 2016, 11 pages.
(Continued)

*Primary Examiner* — Andrew J Coughlin
*Assistant Examiner* — Jessica M Apenteng

(57) ABSTRACT

A LED module is disclosed comprising a LED chip including at least one LED arranged to direct a luminous output centered about an optical axis towards a light exit surface; an optical layer separated from the light exit surface by a spacing region having a lower refractive index than the optical layer and a material comprising the light exit surface, the optical layer being arranged to redirect the luminous output in a direction under a non-zero angle with the optical axis; and a collimating element over the optical layer, the collimating element being arranged to collimate the redirected luminous output in said direction. A lighting module including one or more of such LED modules is also disclosed.

20 Claims, 8 Drawing Sheets

(51) Int. Cl.
*G02B 27/30* (2006.01)
*F21S 41/143* (2018.01)

(58) Field of Classification Search
USPC .................................................. 362/516, 540
See application file for complete search history.

(56) References Cited

OTHER PUBLICATIONS

Extended European Search Report dated Feb. 17, 2016 from European Patent Application No. 15183484.3 filed Sep. 2, 2015, 7 pages.

\* cited by examiner

LED MODULE AND LIGHTING MODULE

CROSS-REFERENCE TO RELATED APPLICATIONS

The present application is a § 371 application of International Application No. PCT/EP2016/070041 filed on Aug. 25, 2016 and titled "LED MODULE AND LIGHTING MODULE," which claims the benefit of European Patent Application No. 15183484.3 filed on Sep. 2, 2015. International Application No. PCT/EP2016/070041 and European Patent Application No. 15183484.3 are incorporated herein.

FIELD OF THE INVENTION

The present invention is concerned with a LED module containing at least one LED chip arranged to direct its luminous output centered about an optical axis towards a light exit surface.

The present invention is further concerned with a lighting module including at least one such a LED module.

BACKGROUND OF THE INVENTION

Light emitting diodes (LEDs) are rapidly gaining popularity because of their longevity and low energy credentials. Advances in manufacturing have led to the emergence of chip-sized LED packages or modules in which at least one LED, and typically a plurality of LEDs are packaged together and presented as a single die. Such packages are therefore sometimes referred to as single die emitters (SDEs). Due to the Lambertian luminous distribution and brightness produced by such packages, they are considered a key enabler of LED-based solutions in a number of application domains, including automotive lighting and projection lighting.

Such LED modules typically produce a Lambertian luminous distribution centered about an optical axis of the package. In some application domains including but not limited to automotive front lighting, e.g. automotive head lamps, the use of such packages must therefore be combined with additional optical elements in order to reshape and redirect the luminous distribution in the desired direction, often to comply with the appropriate regulations concerning allowable beam profiles generated by different types of head lamps, e.g. full beams, dipped or low beams, and so on.

WO 2015/090706 A1 discloses a lighting device with beam shaping. The lighting device comprises a light source, an optical plate and a reflector. The optical plate is configured to provide a beam having a non-zero angle with the original optical axis of the light source.

U.S. Pat. No. 8,764,259 B2 discloses a lighting assembly including a semiconductor light source, a support with a recess within which the semiconductor light source is positioned, and a collimator having light entry and light exit openings joined together by at least one side wall. The collimator is moveable relative to the support. The collimator is attached to the support such that the light entry opening of the collimator and the recess are joined in a nested manner so that light emitted by the semiconductor light source within the recess enters the collimator through the light entry opening and exits essentially only through the light exit opening of the collimator for any position of the collimator over its range of motion. The lighting assembly further includes an actuator for moving the collimator over at least part of its range of motion.

This assembly is relatively bulky and costly.

SUMMARY OF THE INVENTION

The present invention seeks to provide a cost-effective application-specific LED module.

The present invention further seeks to provide a lighting module including at least one such LED module.

According to an aspect, there is provided a LED module comprising a LED chip including at least one LED arranged to direct a luminous output centered about an optical axis towards a light exit surface; an optical layer separated from the light exit surface by a spacing region having a lower refractive index than the optical layer and a material comprising the light exit surface, the optical layer being arranged to redirect the luminous output in a direction under a non-zero angle with the optical axis; and a collimating element over the optical layer, the collimating element being arranged to collimate the redirected luminous output in said direction. The LED module is arranged to generate multiple beams in different directions. To this end, the optical layer comprises a first region arranged to redirect a first portion of the luminous output in a first direction under a first non-zero angle with the optical axis; and a second region arranged to redirect a second portion of the luminous output in a second direction under a second non-zero angle with the optical axis, the first direction being different to the second direction; wherein the collimating element is arranged over the first region to collimate the first portion of the redirected luminous output in said first direction, the LED module further comprising a further collimating element arranged over the second region to collimate the second portion of the redirected luminous output in said second direction.

Such a LED module can provide a directional luminous output tailored to a specific application in a compact and cost-effective manner by the provision of an asymmetric micro-structured optical layer such as an optical film on the light exit surface of the LED chip, which optical layer collimates and redirects the luminous output of the one or more LEDs in an off-axis direction, with the asymmetric collimator providing further collimation to yield a highly collimated off-axis centered light beam. This for instance allows for high-contrast multi-directional luminous distributions to be generated by a lighting module comprising a plurality of such LED modules that are arranged to generate off-axis luminous outputs in multiple directions. Particularly, the present invention facilitates the generation of LED modules that can produce directional beams tailored to specific applications using the same LED chip, e.g. LED chips manufactured on a flat (2D) substrate, e.g. surface-mounted device (SMD) LED chips. This therefore significantly simplifies the LED module design and manufacturing, as the desired beam directionality of the LED module is decoupled from the LED chip design due to the use of the optical layer combined with the asymmetric collimator.

In the context of the present application, the term asymmetric should be interpreted as non-symmetric relative to the optical axis of the LED chip (and/or lighting module). It does not necessarily imply that the optical element itself does not comprise an internal axis or plane of symmetry.

In a preferred embodiment, the spacing region is embodied by an air gap due to the low intrinsic refractive index of air. The presence of a low refractive region in between the LED chip and the beam shaping optics, i.e., the optical layer generates a reduced collimation angle and narrower beam width (for a given propagation distance of the light). Such a low refractive region and in particular an air gap therefor may facilitate a narrower collimation angle without increasing the dimensions of the optical film.

The LED chip typically has at least one side surface extending from the light exit surface, the LED module optionally further comprising a reflective element covering the at least one side surface. This improves the luminous efficiency of the LED module as the amount of light exiting the light exit surface is increased by the reflective element.

The collimating element may comprise a conduit enveloped by a body, the conduit having a main propagation direction under said non-zero angle with the optical axis, the body being arranged around the light exit surface. In this manner, substantially all light exiting the light exit surface is captured by the collimating element, thus providing a LED module with particularly high optical efficiency. The body may be supported by the reflective element.

In an embodiment, the optical layer comprises a plurality of facets each arranged to redirect a portion of the luminous output in the direction under a non-zero angle with the optical axis. Such an optical layer comprising faceted microstructured elements may be manufactured in a cost-effective manner, thus reducing the overall cost of the LED module. For instance, the optical layer may be an optical polymer layer such as an optical film.

According to another aspect, there is provided a lighting module comprising a LED module according to any of the above embodiments. Such a lighting module can be kept compact whilst producing off-axis luminous distributions, e.g. light beams for instance due to the fact that a relatively flat (2D) light module such as a SMD module can be used in combination with compact optical elements that create the desired directionality in the luminous output of the lighting module.

Preferably, the lighting module comprises a plurality of said LED modules including at least one first LED module arranged to generate a collimated luminous output in a first direction under a first non-zero angle with a lighting module optical axis; and at least one second LED module arranged to generate a collimated luminous output in a second direction under a second non-zero angle with the lighting module optical axis; the first non-zero angle being different to the second non-zero angle. This provides a lighting module capable of generating multi-directional luminous outputs, e.g. multiple beams under different angles.

In an embodiment, the lighting module comprises an array of first LED modules each arranged to generate a collimated luminous output in the first direction under said first non-zero angle with a lighting module optical axis; and an array of second LED modules each arranged to generate a collimated luminous output in the second direction under said second non-zero angle with a lighting module optical axis, wherein the first non-zero angle is a positive angle and the second non-zero angle is a negative angle. This provides a lighting module capable of generating multi-directional luminous outputs, e.g. multiple beams under different angles including a first angle above a plane including the light module optical axis and a second angle below this plane. This for instance may be beneficial in automotive headlight applications, to generate a full beam and low beam respectively.

The first non-zero angle and the second non-zero angle may have the same absolute value, e.g. to produce an overall symmetrical luminous distribution.

Alternatively, the lighting module may comprise an array of LED modules including the first LED module and the second LED module, thus providing an array that can produce light in multiple directions.

Alternatively, the lighting module may comprise a pattern of LED modules including the first LED module and the second LED module, wherein the first and second directions are divergent. In this embodiment, the lighting module may produce a divergent beam.

Alternatively, the lighting module may comprise a pattern of LED modules including the first LED module and the second LED module, wherein the first and second directions are convergent. In this embodiment, the lighting module may produce a convergent beam.

The respective LED modules may be individually controllable to provide configurable lighting module.

In some embodiments, the lighting module is a vehicle headlight module benefiting from the directionality of the LED modules, such that a vehicle headlight module requiring minimal beam shaping elements can be provided. It should however be understood that the lighting module may also be used in other application domains, such as for instance but not limited to pixelated lighting applications, e.g. spot lighting, matrix signs, illumination-based road signs, street lighting, and so on. Embodiments of the present invention may be applied in any application domain in which directional lighting under a non-zero angle with the optical axis of a LED engine, i.e. a LED chip, is desired.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
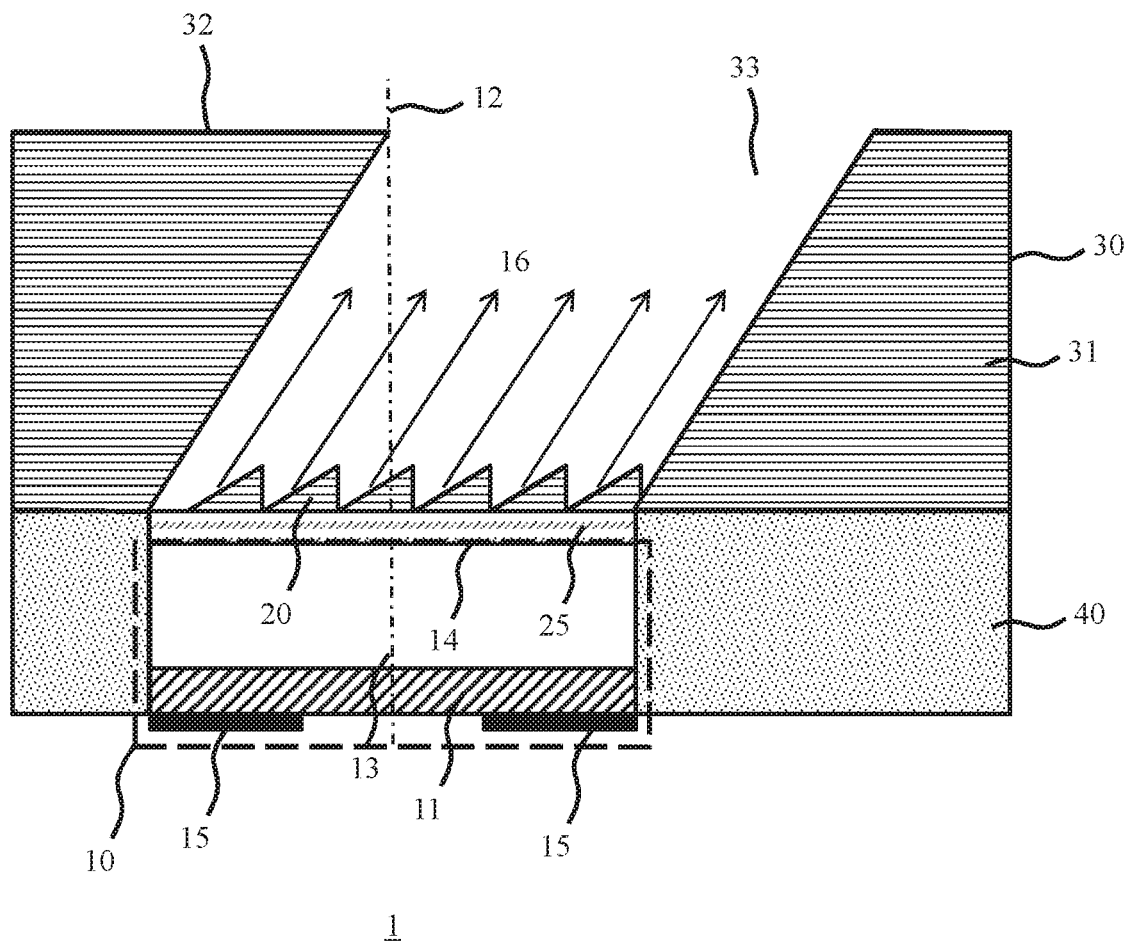
FIG. 1 schematically depicts a LED module according to an example embodiment.

It should be understood that the Figures are merely schematic and are not drawn to scale. It should also be understood that the same reference numerals are used throughout the Figures to indicate the same or similar parts.

FIG. 1 schematically depicts a LED module 1 according to an example embodiment. The LED module 1 comprises a LED chip 10 including an active die area 11 incorporating at least one LED, typically a plurality of LEDs arranged to produce a luminous distribution about an optical axis 12 of the LED chip 10 towards a light exit surface 14. The active die area may be mounted on a transparent carrier substrate 13, e.g. in the case of SMD LED chips and arranged to direct its luminous output towards the light exit surface 14 of the transparent carrier substrate 13. The transparent carrier substrate 13 may be made of any suitable transparent substrate material, e.g. sapphire. The LED module 1 may further comprise one or more phosphors for wavelength conversion of the luminous output produced by the one or more LEDs in the active die area 11, e.g. to generate a luminous output of a particular spectral composition, e.g. white light of a particular color temperature. Such phosphors for instance may be mounted on the sapphire substrate 13. Suitable phosphor applications include but are not limited to a silicone matrix over the sapphire substrate 13 including phosphor powder or a ceramic phosphor. The LED chip 10 may further comprise one or more electrically conductive external contacts 15, e.g. metal or metal alloy contacts, for providing electricity to the LEDs. The contacts 15 for instance may form the anode and cathode contacts of the LED chip 10.

As is well-known per se, LEDs typically generate a Lambertian light distribution about an optical axis, i.e. a symmetric light distribution, which in the example embodiment of FIG. 1 is projected about the optical axis 12. In accordance with an embodiment, the light exit surface 14 carries an asymmetric optical layer 20, preferably a microstructured asymmetric optical layer 20, such as an asymmetric optical layer 20 comprising a plurality of micro-facets, arranged to redirect the light distribution generated by the one or more LEDs in a first direction under a non-zero angle with the optical axis 12 to create a redirected light distribution 16. The non-zero angle may be defined by the shape of the asymmetric optical layer 20, e.g. by the shape of the microstructures such as the micro-facets, e.g. the surface angle of the micro-facets and/or by the refractive index of the material of the asymmetric optical layer 20.

In an embodiment, the asymmetric optical layer 20 is an optical grade polymer layer. An optical grade silicone is particularly preferred due to the attractive heat resistance properties of silicones, which makes these polymers particularly suitable to cope with the heat generated by the one or more LEDs although other optical grade polymers, e.g. polycarbonate, PMMA, PET and so on, may also be contemplated, which may be formed on the LED module in any suitable manner, e.g. through overmolding, embossing, and so on. Alternatively, transparent ceramics, e.g. $Al_2O_3$, YAG or glass sheets may be used as materials for the optical layer 20, which for example may be bonded to the LED chip 10 using a suitable adhesive such as a silicone adhesive.

According to one embodiment, the optical layer 20 consists of a Fresnel plate or Fresnel foil. Fresnel foils are characterized by the optical property of collimation or partial collimation, based upon the principles of Fresnel lenses. The plate may for example comprise a symmetric or asymmetric array of prismatic grooves or prismatic/pyramid structures facing toward or away from the light source, i.e. the one or more LEDs of the LED chip 10. The prismatic or pyramid elements may vary in their shape or in other optical properties across the surface of the plate, so as to refract incident light by differing degrees at different points across the optical film 20. The overall distribution in shapes or other optical properties may be chosen so as to generate the particular degree of collimation and/or ray redirection as required. In an embodiment, the prismatic elements of the Fresnel plate or foil have a prismatic angle, i.e. the angle of the sloped prism surface relative to the main surface of the optical film 20, in the range of 10-40°, preferably 15-30°.

Fresnel lenses carry significant advantages over conventional lenses in that a large aperture and short focal length are achievable with significantly reduced mass and thickness. Fresnel structures may be made significantly thinner in comparison with conventional lens counterparts, and in the case of Fresnel foils or plates, take the form of a planar sheet or film. The short focal length renders them particularly suitable for miniaturized lighting applications, and the minimized thickness allows for reduced overall height of lighting packages.

Fresnel structures are also capable of capturing light of more oblique angle than conventional lenses, allowing for a more efficient collimating action: oblique rays exiting the light exit surface of the LED chip 10 which might otherwise fall outside of the acceptance angle of a conventional lens are nonetheless captured and collimated by the Fresnel foil. This allows for greater overall efficiency of the LED chip 10, since less light must be sacrificed by the asymmetric collimating element 30.

According to one example, the optical film 20 comprises an enhanced or adapted Fresnel foil, characterized by comprising one or more optical sheets having a set of parallel pyramidal ridges arranged linearly, rather than circularly. In particular, this arrangement may comprise two microstructured sheets, each sheet comprising a structured layer, the structured layers having an array of elongate locally parallel ridges facing away from the light source, and having an apex angle at the peak of each ridge, wherein the ridges of one sheet are crossed with the ridges of the other sheet such that the local crossing angle is between 30 and 150 degrees. The crossed ridges reflect light incident at certain angles and refract and transmit light incident at other angles, i.e. non-zero angles with the optical axis 12. This variation carries the particular advantage that light falling incident upon the structure, within a certain critical angle cone, is reflected back toward the phosphor or light source, while light outside of this angle cone is refracted and transmitted. Back-reflected light is scattered in the phosphor of the LED chip 10 if present and subsequently has a second chance of escaping through the light exit surface 14 and the optical layer 20. This property of light recycling allows for the optical film 20 to be positioned closer to the phosphor and/or one or more LEDs of the LED chip 10 without loss of intensity, since rays falling outside of the critical acceptance angle for refraction and transmission are not sacrificed but re-directed through reflection. The reflected light still exits the LED chip 10 after redirection, e.g. some bouncing, within the module such that almost all rays generated by the one or more LEDs of the LED chip 10 ultimately exit the module within the desired collimation angle range, e.g. when the asymmetric optical layer 20 imparts a degree of collimation onto the light distribution produced by the one or more LEDs in the die area 11.

The asymmetric optical layer 20 is separated from the light exit surface 14 of the substrate 13 by a spacing region 25 that has a lower refractive index than the substrate 13 and the optical layer 20. For example, the spacing region 25 may comprise low refractive index materials such as air-filled foams. In a preferred embodiment, the spacing region 25 is formed by an air gap.

In addition, the LED module 1 comprises an asymmetric collimating element 30 arranged to collimate the redirected luminous distribution 16. The asymmetric collimating element 30 is typically arranged to collimate the redirected luminous distribution 16 in a further direction under a non-zero angle with the optical axis 12. The further direction preferably coincides with the first direction in order to optimize luminous yield of the LED module 1. The collimating element 30 may comprise a conduit 33 delimited by a body 31 having a light exit surface 32 defining a light exit window of the conduit 33, which body 31 may be a reflective body to retain the redirected light distribution 16 within the conduit 33. The conduit 33 may be an air-filled gap in some embodiments or may comprise a low refractive optical material in some alternative embodiments, i.e. a material having a lower refractive index than the optical film 20.

The collimating element 30 may have a black body 31 that subsequently reflects the luminous output of the optical film 20 several times from the inner surface(s) of the body 31 in order to acquire a luminous distribution with a main or central propagation angle under a non-zero angle with the optical axis 12 that is within desired limits.

Although an absorbing surface, i.e. a black body 31, means that light falling outside of the desired angular limits is sacrificed, rather than reflected and re-directed, use of an optical element 20 in the form of a Fresnel foil ensures that only a small fraction of the total light generated by the LED chip 10 is lost in this way. Hence the dimensional advantage of an absorbing secondary collimating body may be achieved without significant loss in output efficiency.

According to a second example, the asymmetric collimating element 30 may have a body 31 with a reflective surface. In this case, light with too large an escape angle is not absorbed and sacrificed, but rather is reflected. The light may for example be redirected back toward the optical film 20 or may be further reflected from the surface(s) of the collimating body 31. A reflecting surface ensures that light is not lost and so efficiency is maximized. However, contrast is to some extent compromised, since a small proportion of rays may escape the light exit window 33 via reflection from the body surface, these rays not having propagation direction which is within the limits defined by the body shape of the asymmetric collimating element 30. As a result, the generated beam edge may exhibit greater fuzziness. However, as with the black body, use of a Fresnel optical film 20 may significantly limit the degree of this effect, since the majority of rays are already compliant with the desired angular limits.

The LED module 1 may further comprise a reflective element 40 on its side surfaces extending from light exit surface 14. The reflective element 40 typically covers at least the die area 11 of such side surfaces to prevent light generated by the one or more LEDs in the die area to escape the LED module 1 through a surface other than the light exit surface 14. The body 31 of the collimating element 30 may be supported by the reflective element 40 although this is not necessary. The reflective element 40 may be specularly reflective or diffusively reflective, e.g. a bulk volumetric scattering reflector or a thin film reflector. The reflective element 40 in some embodiments may be formed by dispensing or depositing a reflective material around the one or more LEDs of the LED chip 10, e.g. using a syringe or another deposition tool. Suitable reflective materials for instance include a silicone composition with suspended reflective titanium oxide particles. The asymmetric collimating element 30 may be supported on the reflective element 40, e.g. by pressing the asymmetric collimating element 30 into the reflective material before curing the latter.

In an embodiment, the reflective material may be deposited or dispensed to a level above the one or more LEDs, thereby forming an air gap 25 over the LEDs. The air gap 25 may be formed by partial removal of the reflective material over the one or more LEDs. Alternatively, a sacrificial layer may be applied over the one or more LEDs prior to the formation of the reflective element 40 by deposition or dispensing of the reflective material, which sacrificial layer is removed following the formation of the reflective element 40.

Three other variant examples exist of methods by which LED chips 10 may be produced that include an air gap. In the first example, layered phosphors are used which include an embedded air cavity and a layer stack of e.g. YAG ($Y_3Al_5O_{12}$) with an air-filled top. In this case, the phosphor layer effectively extends to fill the entire space over the one or more LEDs, with the phosphor layer comprising a layered structure including an upper air-filled layer. In the second example, a sheet material layer 25 with incorporated air inclusions is applied to the top of the LED chip 10 (with or without phosphor). In the third example, a temporary filler material (e.g. resist) is applied to the top of the LED chip 10 (with or without phosphor). Following fixture of the optical layer 20, the temporary filler material is removed to form the air gap. The filler material might be easily removed, for example, through use of a solvent.

The LED module 1 according to embodiments of the present invention generates collimated light in a direction under a non-zero angle with its optical axis 12, or more broadly, with its axis of symmetry or central axis. Consequently, the orientation of the LED module 1 impacts on the direction in which the LED module 1 generates its luminous output. This aspect may be utilized by combining multiple LED modules 1 in a lighting module, wherein the respective LED modules 1 are placed in different orientations such that the lighting module can generate collimated light in different directions or can create directional light patterns that cannot be achieved using LED modules that generate their luminous output about their optical axes. It is of course when assembled planar/on a flat 2D surface equally feasible to provide a lighting module including a single LED module or a plurality of LED modules in the same orientation, e.g. to produce a lighting module that delivers collimated light in a single direction under a non-zero angle with its central axis. This is particularly applicable to planar LED chips 10 or LED chips 10 where the active die area 11 is mounted on a flat substrate such as the transparent substrate 13, e.g. SMD LED chips.

Although not specifically shown, the LED module 1 in an alternative embodiment may comprise more than one collimator element 30 in order to produce multiple collimated beam portions in different directions. To this end, the optical layer 20 may comprise a first region arranged to redirect a first portion of the luminous output of the one or more LEDs in a first direction under a first non-zero angle with the optical axis 102 and a second region arranged to redirect a second portion of the luminous output of the one or more LEDs in a different second direction under a second non-zero angle with the optical axis 102. In this embodiment, the LED module 1 typically comprises a first collimating element 30 arranged over the first region to collimate the first portion of the redirected luminous output in said first direction and a second collimating element 30 arranged over the second region to collimate the second portion of the redirected luminous output in said second direction. It will be immediately apparent that this concept may be further generalized to an optical layer 20 comprising N such regions over which N collimating elements are respectively positioned, with N being a positive integer of at least two, such as N=2, 3 or 4.

Figure 2:
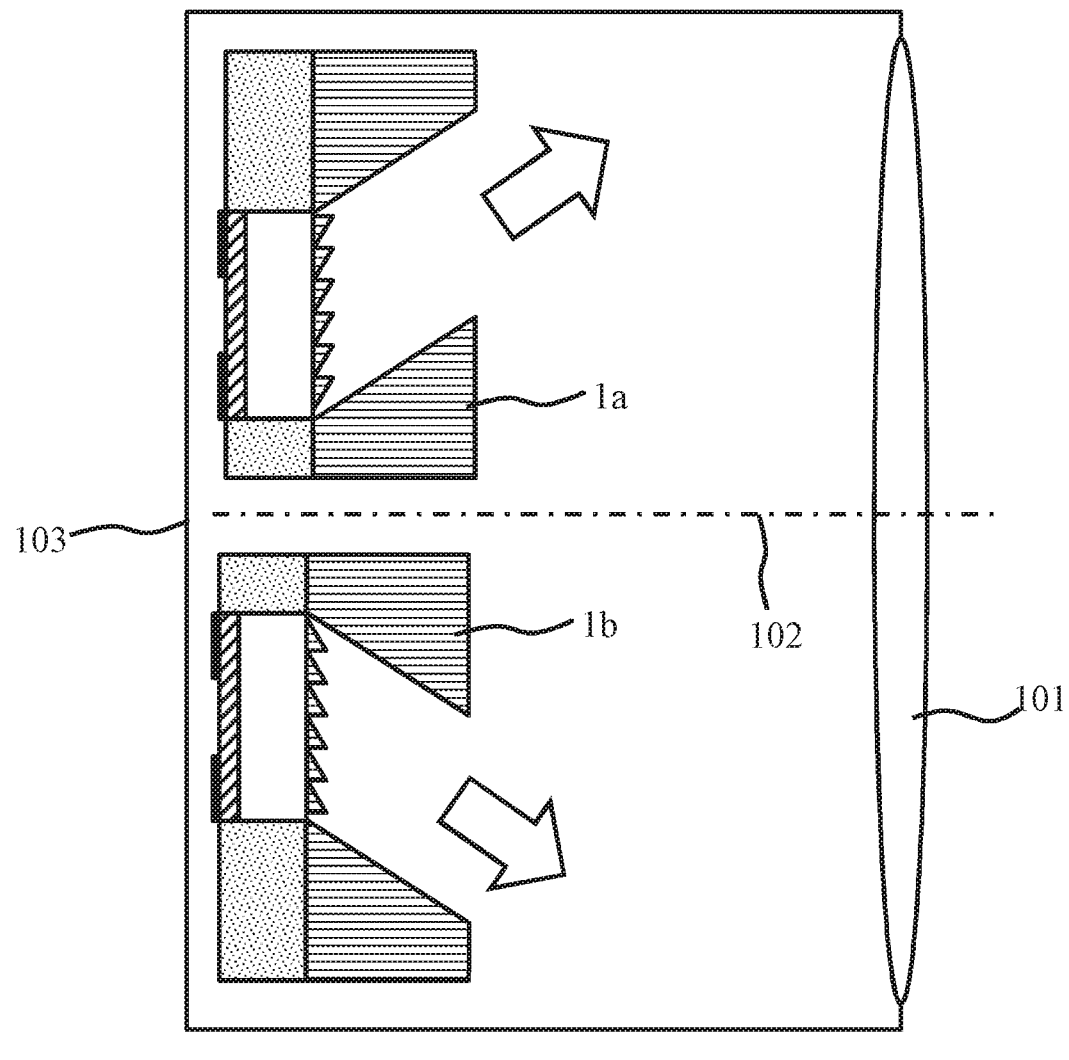
FIG. 2 schematically depicts a cross-section of a lighting module according to an example embodiment.

FIG. 2 schematically depicts a lighting module 100 including at least one first LED module 1a arranged to generate a collimated luminous output in a first direction under a first non-zero angle with a lighting module optical axis 102 as indicated by the upward pointing block arrow and at least one second LED module 1b arranged to generate a collimated luminous output in a second direction under a second non-zero angle with the lighting module optical axis 102 as indicated by the downward pointing block arrow. The first non-zero angle is different to the second non-zero angle although in some embodiments there absolute value may be the same, for example if the generation of an overall symmetrical light pattern or distinct light patterns in mirror-imaged directions is desirable.

In the embodiment of FIG. 2 as well as in the following embodiments, the one or more first LED modules 1a may be the same as or may be different to the one or more second LED modules 1b. For example, the luminous distribution generated by the one or more first LED modules 1a may require a different colour and/or a different intensity than the luminous distribution generated by the one or more second LED modules 1b, which for instance may be achieved by integrating different types of LEDs, different numbers of LEDs and/or different optical elements, e.g. different phosphors in the respective LED modules 1a, 1b.

The lighting module 100 may comprise a housing 103 in which the one or more first LED modules 1a and the one or more second LED modules 1b are integrated. The one or more first LED modules 1a and the one or more second LED modules 1b may be integrated in the housing 103 in any suitable manner.

The housing 103 may further comprise additional optical elements, such as an exit lens or window 101, with the one or more first LED modules 1a and the one or more second LED modules 1b arranged to redirect their respective luminous outputs towards the exit lens 101. The exit lens 101 may be integrated in the housing 103 in any suitable manner.

In an embodiment, the optical axis 102 may form part of a virtual (horizontal) plane dissecting the lighting module 100 in terms of produced luminous distribution. Specifically, the luminous distribution produced by the one or more first LED modules 1a may be directed to above this virtual plane and the luminous distribution produced by the one or more second LED modules 1b may be directed to below this virtual plane. This for instance is beneficial in certain application domains such as automotive lighting, where the lighting module 100 may be a head lamp module arranged to generate a full beam with the one or more first LED modules 1a or with the combination of the one or more first LED modules 1a and the one or more second LED modules 1b in a first configuration and to generate a dipped beam or low beam with the one or more second LED modules 1b in a second configuration. This for instance can achieve a head lamp module producing improved spatial separation between the respective beams.

To this end, the one or more first LED modules 1a may be controllable independently from the one or more second LED modules 1b. The respective LED modules 1a, 1b of the lighting module 100 may be individually controllable in some embodiments. A controller (not shown) may be present to facilitate the desired control configuration, as will be readily understood by the skilled person. Such a controller may be hard-wired to a user interface, such as a button, switch or dial in a vehicle, a building or the like depending on the application domain in which the lighting module 100 is applied, or may include a wireless signal receiver for receiving a signal from a wireless control module, e.g. a dedicated wireless control module such as a remote control or a configurable wireless communication device such as a smart phone, tablet, smart watch or the like, configured to operate the lighting module 100, e.g. through an app installed on the configurable wireless communication device.

Figure 3:
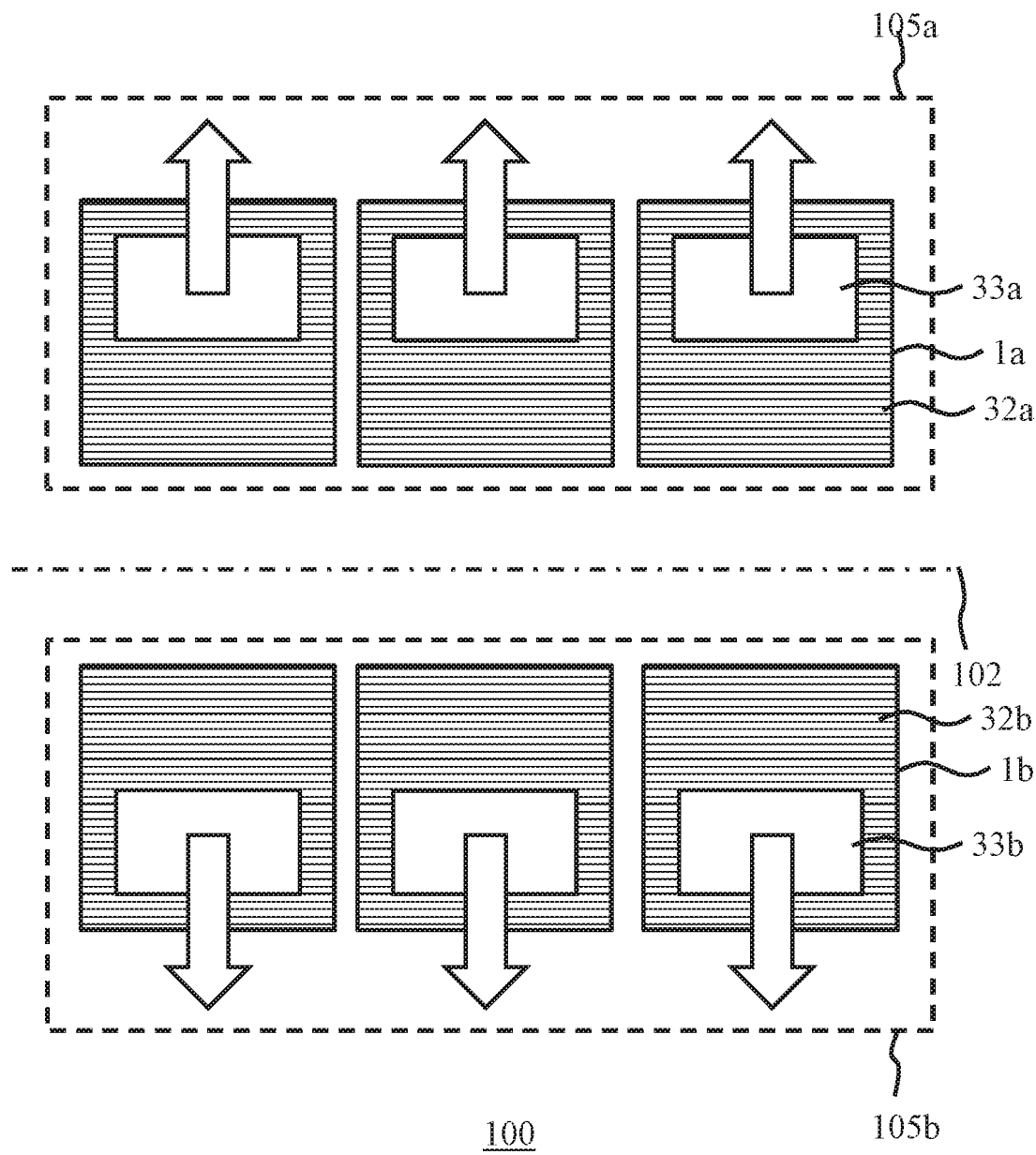
FIG. 3 schematically depicts a front view of a lighting module according to an example embodiment.

FIG. 3 schematically depicts a front view of an example embodiment of the lighting module 100. In this embodiment, the lighting module 100 comprises a first array 105a of first LED modules 1a each arranged to generate a collimated luminous output in the first direction under said first non-zero angle with a lighting module optical axis 102 as indicated by the upward pointing block arrows exiting the conduits 33a delimited by respective light exit surfaces 32a of the collimator elements of the LED modules 1a. The lighting module 100 further comprises a further array 105b of second LED modules 1b each arranged to generate a collimated luminous output in the second direction under said second non-zero angle with the lighting module optical axis as indicated by the downward pointing block arrows exiting the conduits 33b delimited by respective light exit surfaces 32b of the collimator elements of the LED modules 1b.

The first non-zero angle may be a positive angle and the second non-zero angle may be a negative angle as previously explained in order to generate light beams above and below the previously mentioned virtual plane including the optical axis 102. The absolute values of the first and second non-zero angles may be identical as previously explained. The respective LED modules 1a, 1b may be controlled as described above. The respective LED modules 1a, 1b may be individually controllable or may be controllable at the array level, i.e. the respective arrays 105a, 105b may be individually controllable.

Figure 4:
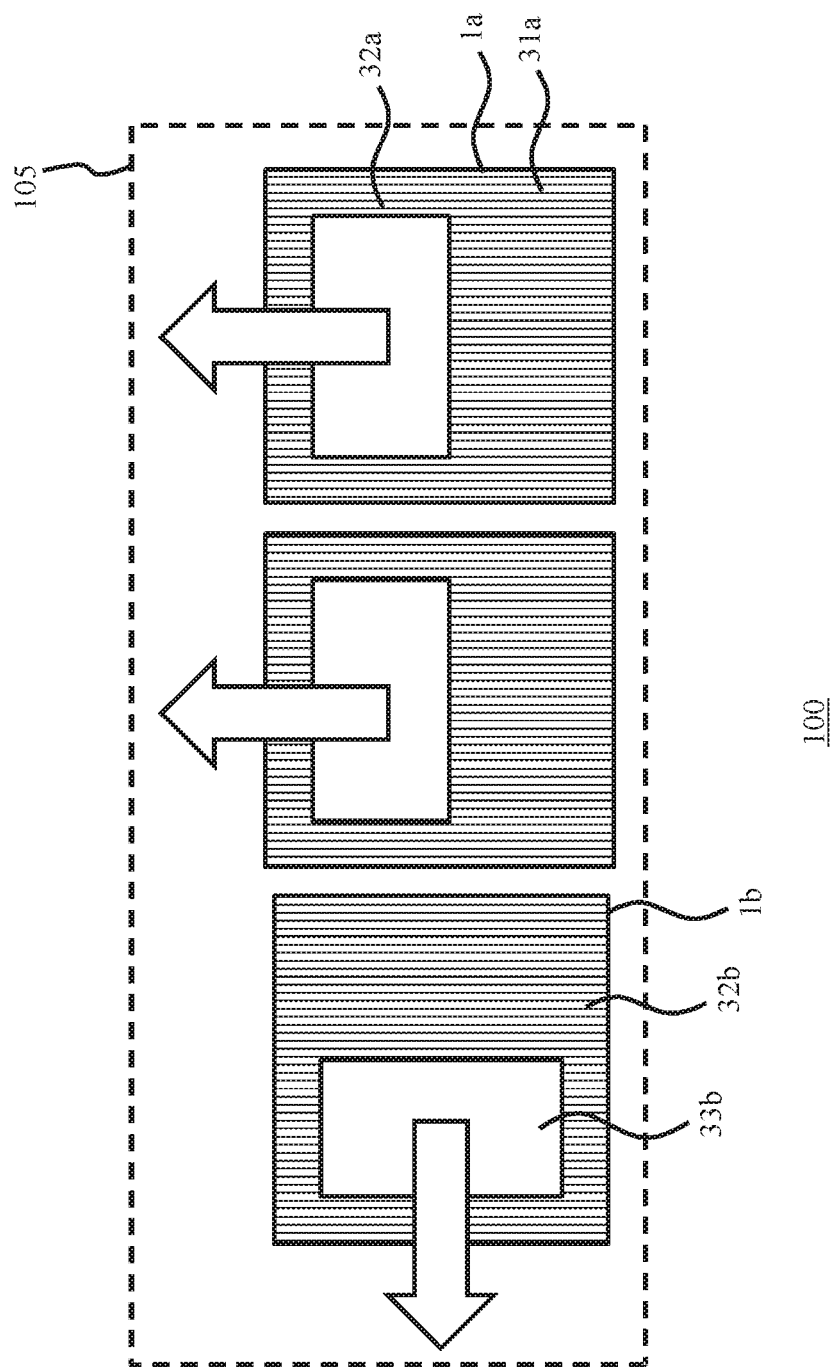
FIG. 4 schematically depicts a front view of a lighting module according to another example embodiment.

FIG. 4 schematically depicts a front view of another example embodiment of the lighting module 100. In this embodiment, the lighting module 100 comprises an array 105 including a plurality of first LED modules 1a each arranged to generate a collimated luminous output in the first direction under said first non-zero angle with a lighting module optical axis 102 as indicated by the upward pointing block arrows exiting the conduits 33a delimited by respective light exit surfaces 32a of the collimator elements of the LED modules 1a. The array 105 further comprises at least one second LED module 1b arranged to generate a collimated luminous output in the second direction under said second non-zero angle with the lighting module optical axis as indicated by the sideways pointing block arrow exiting the conduit 33b delimited by the light exit surfaces 32b of the collimator element of the at least one LED module 1b. In this manner, more complex beam shapes may be formed by configuring the orientation of the respective LED modules 1 in the lighting module 100 accordingly. For example, an approximated curved or stepped light distribution may be created in this manner, and many other shaped luminous distributions are equally feasible.

Figure 5:
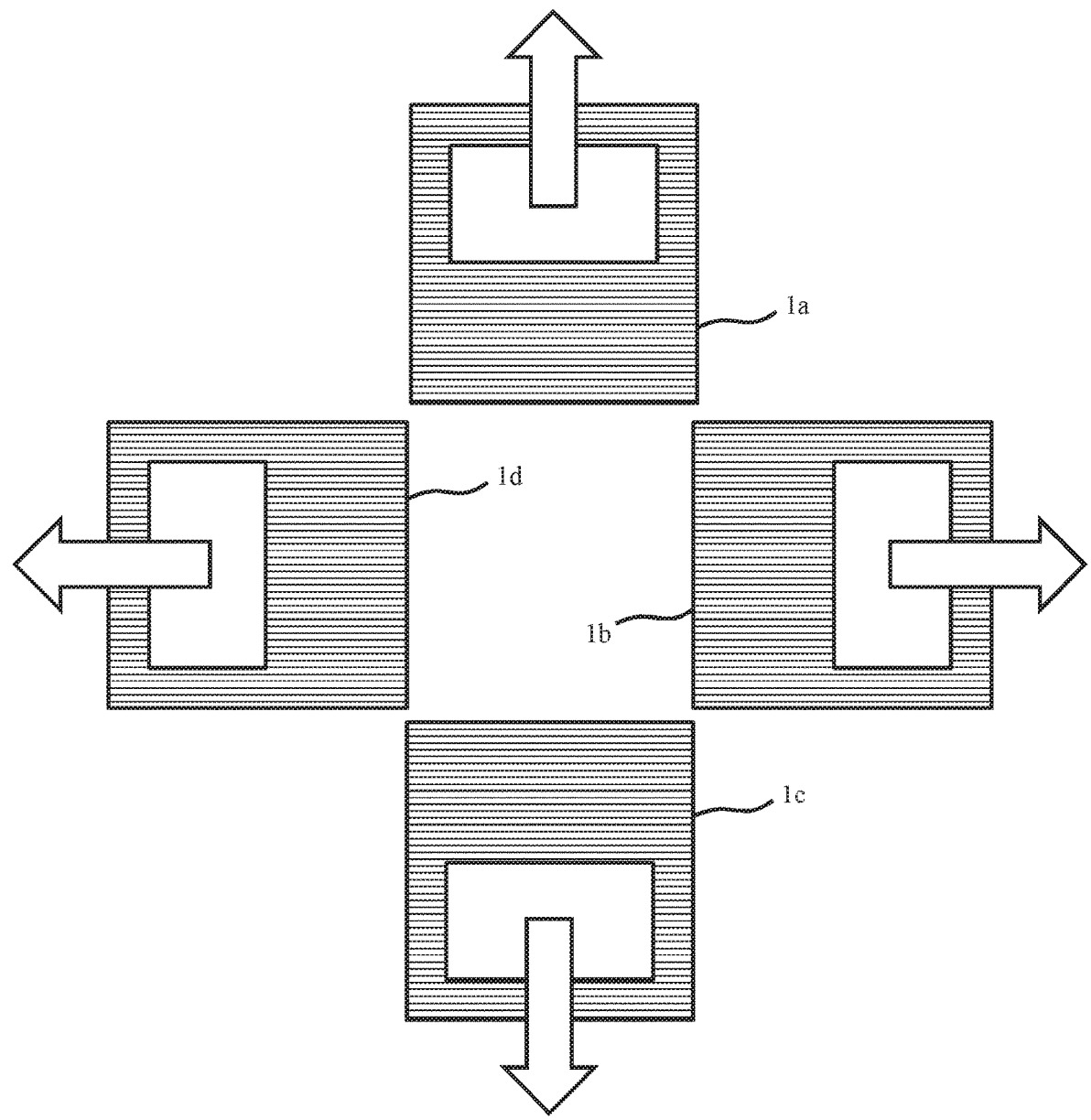
FIG. 5 schematically depicts a front view of a lighting module according to yet another example embodiment.

FIG. 5 schematically depicts a front view of another example embodiment of the lighting module 100. In this embodiment, the lighting module 100 comprises a pattern of LED modules 1a-1d arranged to generate a divergent light beam as indicated by the respective block arrows symbolizing the directional luminous output of the LED modules pointing away from each other.

Figure 6:
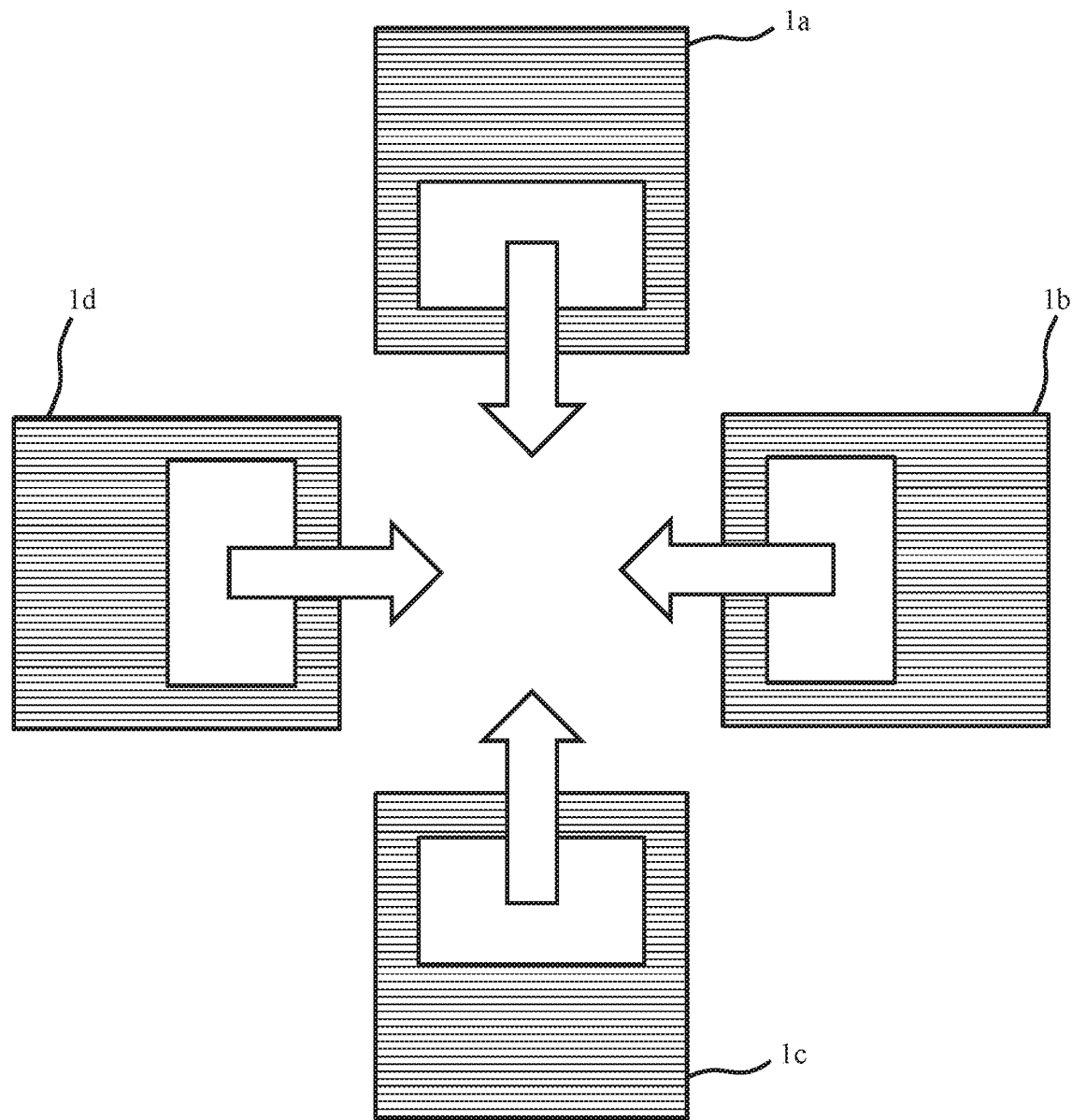
FIG. 6 schematically depicts a front view of a lighting module according to yet another example embodiment.

FIG. 6 schematically depicts a front view of another example embodiment of the lighting module 100. In this embodiment, the lighting module 100 comprises a pattern of LED modules 1a-1d arranged to generate a convergent light beam as indicated by the respective block arrows symbolizing the directional luminous output of the LED modules pointing towards each other.

It should be understood that the foregoing embodiments depicting different configurations of the lighting modules 100 are shown by way of non-limiting example only. Many more configurations in which one or more LED modules 1 are included to create a particular lighting effect or beam shape are of course possible and such additional configurations will be immediately apparent to the skilled person.

In the foregoing embodiments, the electrical footprint of the LED modules 1, i.e. the layout of electrical connections 15, may be symmetrical. This for instance facilitates the provision of a LED module mounting board for a lighting module 100 having a regular pattern of connectors for connecting to the electrical connections 15 of the LED modules 1 such that the LED modules 1 may be mounted on the mounting board in any desirable configuration without requiring a redesign of the mounting board due to the symmetric nature of the electrical footprint of the LED modules 1, which ensures that the orientation of the electrical connections 15 is independent of the rotational orientation of the LED module 1 around its optical axis 12. Hence, this for instance facilitates the provision of the example embodiments of the lighting modules 100 in FIG. 2-6 using the same LED module mounting board.

Figure 7:
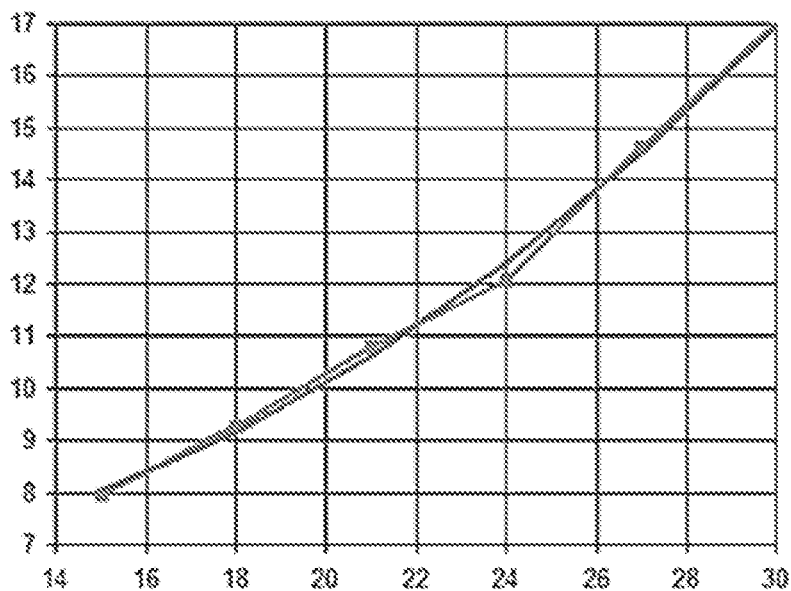
FIG. 7-9 depict simulation results demonstrating proof of concept of at least some aspects of the present invention.
Figure 8:
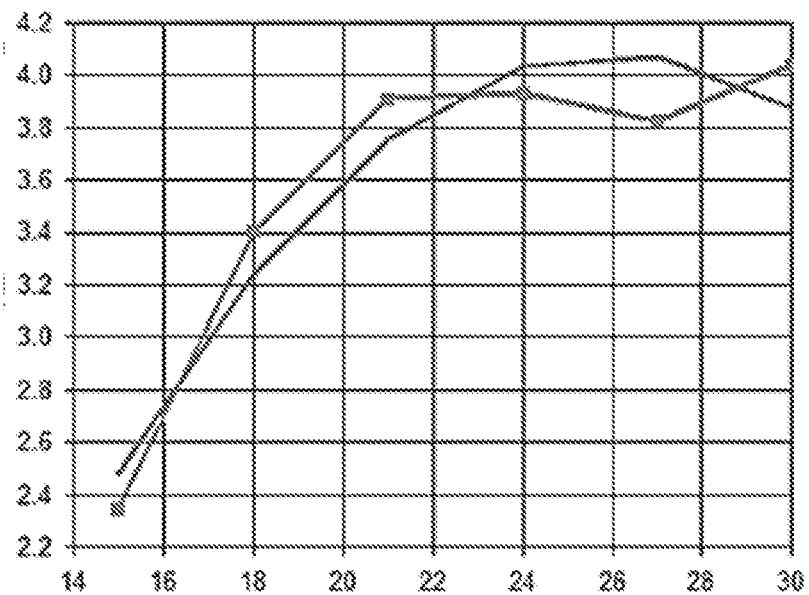

FIG. 7 schematically depicts the result of a simulation in the Lighttools program of the deflection angle (y-axis) achieved for a Lambertian luminance distribution with an optical film 20 comprising prismatic elements having a prismatic angle in the range of 15-30° (x-axis) in the presence of an air gap 25. FIG. 8 schematically depicts the result of a simulation in the Lighttools program of the deflection angle (y-axis) achieved for a Lambertian luminance distribution with an optical film 20 comprising prismatic elements having a prismatic angle in the range of 15-30° (x-axis) in the absence of an air gap 25. The presence of the air gap 25 improves the achieved deflection angle from about 2-4° to about 8-17°, thus indicating the improvement in deflection power of the optical film 20 if the Lambertian luminance distribution, i.e. the luminance produced by one or more LEDs of the LED chip 10 is pre-collimated by the low refractive index of structure 25, e.g. the air gap, between the light exit surface 14 and the optical film 20.

Figure 9:
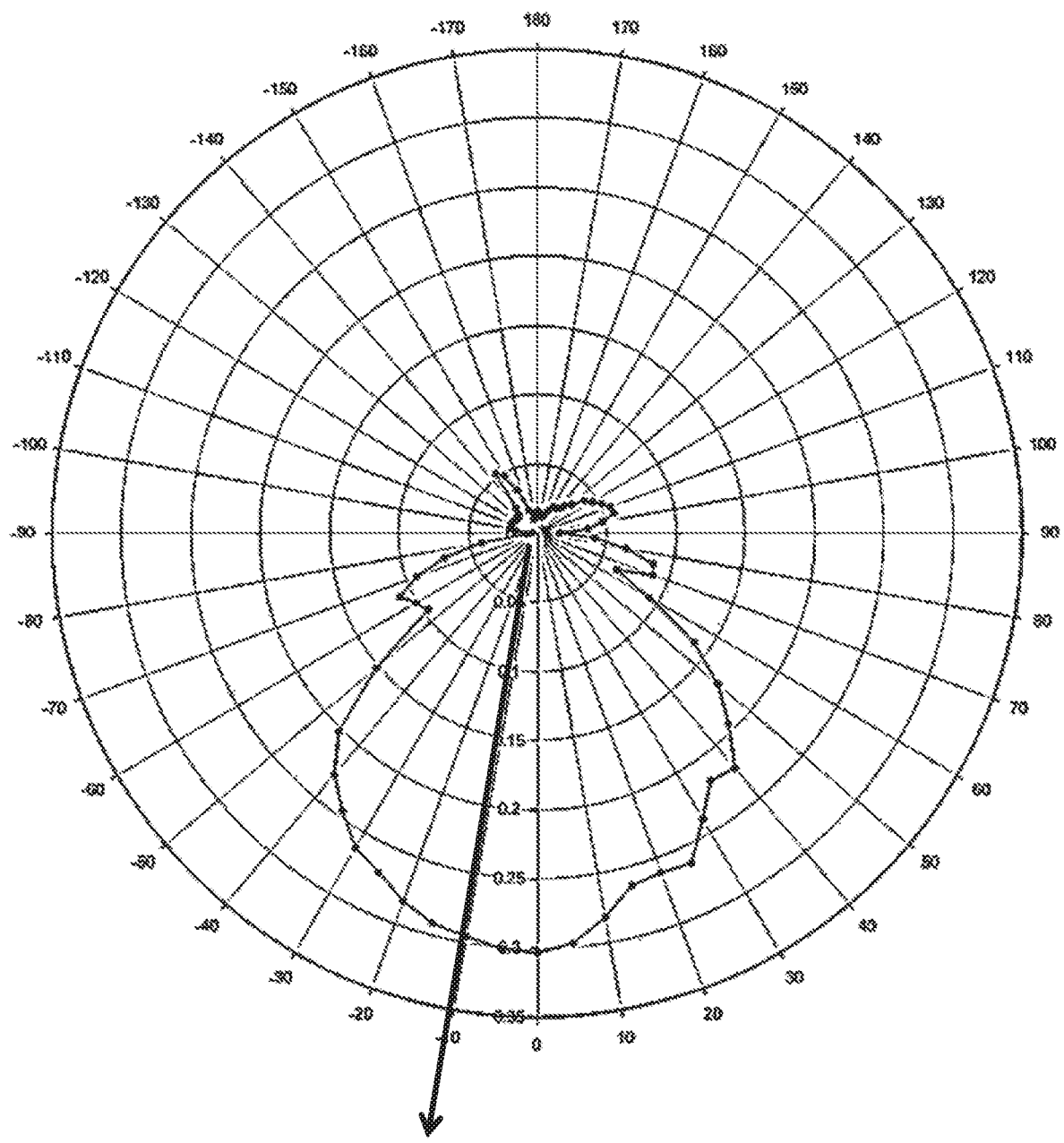

FIG. 9 is a polar plot of a luminous distribution simulated in the Lighttools program of a LED module including an asymmetric Fresnel optical film 20 and an asymmetric black body collimating element 30 having a propagation direction of the body aperture of about 10° relative to the optical axis of the LED chip 10. This clearly highlights that the LED module 1 according to the present invention can effectively create an asymmetric light beam.

As previously mentioned, the lighting module 100 according to embodiments of the present invention finds particularly suitable applicability in automotive lighting applications, for instance as a vehicle headlamp module. However, the applicability of the lighting module 100 according to embodiments of the present invention is not limited thereto. It is equally feasible to apply the lighting module 100 according to embodiments of the present invention in other application domains, such as for example but not limited to miniature or pixelated light sources in general lighting applications, e.g. light bulbs such as spot lights, which for instance may benefit from the excellent light convergence or divergence characteristics of some of the embodiments of the lighting module 100, road signage, e.g. matrix signs, and so on. Another particularly promising application domain of the lighting module 100 is street lighting, as street lamp are regularly required to produce a particular luminous distribution based on a location of the street lamp. For example, a street lamp positioned at a street junction may be required to illuminate portions of more than one street of the junction, which typically requires a different illumination pattern than for a street lamp along a section of a single street. With the lighting modules of the present invention, such different directionality in required luminous output can be readily provided by appropriate positioning of the LED modules 1 on e.g. a mounting board without requiring a redesign of the optics of the LED modules to achieve the different required luminous distributions.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A LED module comprising:
a LED chip including at least one LED arranged to direct a luminous output centered about an optical axis towards a light exit surface so that the luminous output exits the light exit surface;
an optical layer separated from the light exit surface by a spacing region having a lower refractive index than the optical layer and a lower refractive index than another layer that comprises the light exit surface, the optical layer comprising:
a first region arranged to redirect a first portion of the luminous output in a first direction that is at a first non-zero angle with the optical axis; and
a second region arranged to redirect a second portion of the luminous output in a second direction that is at a second non-zero angle with the optical axis, the first direction being different to the second direction; and
a collimating element arranged at least one of adjacent to and over the first region to collimate, in the first direction, the first portion of the redirected luminous output, and
a further collimating element arranged at least one of adjacent to and over the second region to collimate, in the second direction, the second portion of the redirected luminous output.

2. The LED module of claim 1, wherein the spacing region is an air gap and the another layer comprises sapphire.

3. The LED module of claim 1, wherein the LED chip has at least one side surface extending from the light exit surface, the LED module further comprising a reflective element covering the at least one side surface.

4. The LED module of claim 1, wherein collimating elements comprises the collimating element and the further collimating element, the collimating elements comprising a conduit enveloped by a body, the conduit having a main propagation direction at a third non-zero angle with the optical axis, the body being arranged around the light exit surface.

5. The LED module of claim 1, wherein the optical layer comprises a first plurality of facets in the first region each arranged to redirect the first portion of the luminous output at the first non-zero angle with the optical axis and a second plurality of facets in the second region each arranged to redirect the second portion of the luminous output at the second non-zero angle with the optical axis.

6. The LED module of claim 1, wherein the optical layer is an optical polymer layer.

7. The LED module of claim 1, wherein the collimating element has a surface parallel to the first direction and the further collimating element has a further surface parallel to the second direction.

8. A vehicle headlight lighting module comprising the LED module according to claim 1.

9. The LED module of claim 1, wherein at least one of the collimating element and the further collimating element comprises at least one of a black body and a reflective body each arranged to reflect the the first portion of light such that the first portion of light is collimated in the first direction.

10. The LED module of claim 1, wherein the collimating element and the further collimating element are asymmetric to each other about the optical axis.

11. The LED module of claim 1, wherein the optical layer is asymmetric about the optical axis.

12. The LED module of claim 1, wherein the LED module emits a light beam comprising the first portion of the collimated redirected luminous output and the second portion of the collimated redirected luminous output, the light beam being asymmetric about the optical axis.

13. The LED module of claim 1, wherein the light exit surface is a planar light exit surface, and microstructures comprised in the optical layer are disposed on a same plane as each other.

14. The LED module of claim 1, wherein the optical layer comprises microstructures, at least some of the microstructures comprising ridges parallel to each other.

15. A lighting module comprising a plurality of LED modules, the lighting module including:
at least one first LED module arranged to generate a collimated luminous output in a first direction under a first non-zero angle with a lighting module optical axis; and
at least one second LED module arranged to generate a collimated luminous output in a second direction under a second non-zero angle with the lighting module optical axis; the first non-zero angle being different to the second non-zero angle,
each of the at least one first LED module and the at least one second LED module comprising:
a LED chip including at least one LED arranged to direct a luminous output centered about an optical axis towards a light exit surface;
an optical layer separated from the light exit surface by a spacing region having a lower refractive index than the optical layer and having a lower refractive index than another layer that comprises the light exit surface, the optical layer comprising:
a first region arranged to redirect a first portion of the luminous output in a first direction that is at a first non-zero angle with the optical axis; and
a second region arranged to redirect a second portion of the luminous output in a second direction that is at a second non-zero angle with the optical axis, the first direction being different to the second direction;
a collimating element arranged at least one of adjacent to and over the first region to collimate, in the first direction, the first portion of the redirected luminous output, and
a further collimating element arranged at least one of adjacent to and over the second region to collimate, in the second direction, the second portion of the redirected luminous output.

16. The lighting module of claim 15, comprising:
an array of first LED modules each arranged to generate a collimated luminous output in the first direction under the first non-zero angle with the lighting module optical axis; and
an array of second LED modules each arranged to generate a collimated luminous output in the second direction under the second non-zero angle with the lighting module optical axis, wherein the first non-zero angle is a positive angle and the second non-zero angle is a negative angle.

17. The lighting module of claim 15, comprising an array of LED modules including the first LED module and the second LED module.

18. The lighting module of claim 15, comprising a pattern of LED modules including the first LED module and the second LED module, wherein the first and second directions are divergent.

19. The lighting module of claim 15, comprising a pattern of LED modules including the first LED module and the second LED module, wherein the first and second directions are convergent.

20. The lighting module of claim 15, wherein the respective LED modules are individually controllable.

* * * * *